United States Patent [19]

Emma et al.

[11] Patent Number: 5,210,831
[45] Date of Patent: May 11, 1993

[54] METHODS AND APPARATUS FOR INSULATING A BRANCH PREDICTION MECHANISM FROM DATA DEPENDENT BRANCH TABLE UPDATES THAT RESULT FROM VARIABLE TEST OPERAND LOCATIONS

[75] Inventors: Philip G. Emma, Danbury, Conn.; Joshua W. Knight, Mohegan Lake, N.Y.; James H. Pomerene, Chappaqua, N.Y.; Rudolph N. Rechtschaffen, Scarsdale, N.Y.; Frank J. Sparacio, Sarasota, Fla.

[73] Assignee: International Business Machines Corporation, Armonk, N.Y.

[21] Appl. No.: 429,922

[22] Filed: Oct. 30, 1989

[51] Int. Cl.⁵ .................. G06F 9/32; G06F 11/34
[52] U.S. Cl. .................. 395/375; 364/261.3; 364/261.5; 364/261.7; 364/264.6; 364/938.1; 364/938.2; 364/285.4; 364/9460; 364/DIG. 1; 364/944.6; 371/5.1; 371/5.5; 395/800
[58] Field of Search .............. 395/375, 425, 375, 575, 395/800; 371/5.1, 5.5

[56] References Cited

U.S. PATENT DOCUMENTS

| | | | |
|---|---|---|---|
| 3,559,183 | 1/1971 | Sussenguth | 364/200 |
| 4,370,711 | 1/1983 | Smith | 364/200 |
| 4,430,706 | 2/1984 | Sand | 364/200 |
| 4,445,216 | 4/1984 | Kobari et al. | 371/39 |
| 4,477,872 | 10/1984 | Loss et al. | 364/200 |
| 4,710,925 | 12/1987 | Negi | 371/5 |
| 4,763,245 | 8/1988 | Emma et al. | 364/200 |
| 4,764,861 | 8/1988 | Shibuya | 364/200 |
| 4,881,170 | 11/1989 | Morisada | 364/200 |
| 4,939,731 | 7/1990 | Reed et al. | 371/32 |
| 4,984,154 | 1/1991 | Hanatani et al. | 364/200 |
| 5,031,179 | 7/1991 | Yoshida et al. | 371/32 |
| 5,056,092 | 10/1991 | Bruner | 371/14 |
| 5,058,115 | 10/1991 | Blake et al. | 371/401 |

OTHER PUBLICATIONS

"Comprehensive Branch Prediction Mechanism for BC", R. N. Rechtschaffen et al., IBM TDB, vol. 28, No. 5, Oct. 1985.
"Address Generate Interlock Avoidance for Branch Instructions in a Branch-History-Table Processor", G. C. Driscoll et al., IBM TDB, vol. 24, No. 1A, Jun. 1981.
"Preferred Block Encoding for Truncated BHT Entries", P. G. Emma et al., IBM TDB, vol. 28, No. 9, Feb. 1986.

*Primary Examiner*—Thomas C. Lee
*Assistant Examiner*—Ken S. Kim
*Attorney, Agent, or Firm*—Ronald L. Drumheller

[57] ABSTRACT

Methods and apparatus are described for processing branch instructions using a history based branch prediction mechanism (such as a branch history table) in combination with a data dependent branch table (DDBT), where the branch instructions can vary in both outcome and test operand location. The novel methods and apparatus are sensitive to branch mispredictions and to operand addresses used by the DDBT, to identify irrelevant DDBT entries. Irrelevant DDBT entries are identified within the prediction mechanism using state bits which, when set, indicate that: (1) a given entry in the prediction mechanism was updated by the DDBT and (2) subsequent to such update a misprediction occurred making further DDBT updates irrelevant. Once a DDBT entry is determined to be irrelevant, it is prevented from updating the prediction mechanism. The invention also provides methods and apparatus for locating and removing irrelevant entries from the DDBT. The update packet, sent by the DDBT to the history based prediction mechanism, is expanded to include the test operand address actually used by the DDBT. If the state bits indicate the update is irrelevant, then the operand address can be used to locate and delete the offending DDBT entry since the DDBT is organized based on operand addresses. Additionally, the invention provides for inhibiting creation of further DDBT entries when a Branch Wrong Guess event occurs subsequent to a DDBT update to a given prediction mechanism entry.

9 Claims, 4 Drawing Sheets

METHODS AND APPARATUS FOR INSULATING A BRANCH PREDICTION MECHANISM FROM DATA DEPENDENT BRANCH TABLE UPDATES THAT RESULT FROM VARIABLE TEST OPERAND LOCATIONS

BACKGROUND OF THE INVENTION

1. Field of the Invention

The invention generally relates to the field of data processing, and the processing of branch instructions in computing machines. More particularly, the invention is directed to improved methods and apparatus for processing conditional branch instructions, including conditional branches that can vary in both outcome and test operand location.

2. Description of the Related Art

In high performance processors it is a common practice to decompose an instruction into several steps with each step being performed by one of a plurality of different step-processing units. Each step-processing unit typically has the capability of accepting a specific step, for successive instructions, every cycle.

For example, consider a pipeline whose stages are: i) instruction decode (DEC), ii) address generation (AGEN) for operand addresses (or in the case of branch instructions, for branch target addresses), iii) cache access (CACHE) to fetch operands (or in the case of branch instructions, to fetch branch target instructions), and iv) execute (EXEC) to perform the functional operation on the input operands as specified by the instruction. In the absence of branch instructions, the processor can decode a new instruction every cycle. Thus, in the exemplary pipeline four instructions can be in some phase of operation simultaneously.

It is common practice to overlap the successive steps in executing an instruction on a cycle by cycle basis with each following instruction having a one cycle offset. Ideally, this allows one instruction to be handled each cycle even though any given instruction takes several cycles to complete.

This ideal overlap is not always possible for several reasons. A major reason is the frequent occurrence of branch instructions.

When a branch is decoded, further decoding stops since the branch target address must be computed (AGEN) and the target instruction must be fetched (CACHE) before it can enter the pipeline. Hence, even where the branch is unconditional, at least two cycles are "wasted" before processing can continue resulting in a degradation of processor performance.

The unconditional branch referred to in the example is the least severe on processor performance with respect to taken branches. The unconditional branch transfers control from the branch instruction to the target instruction (TARG). That is, at the time that the branch instruction is decoded, it is known that the transfer of control (to TARG) will take place. A more costly (in terms of performance) branch instruction is the conditional branch. This instruction specifies that control is to be transferred to TARG only if some condition (as determined by the outcome of a previous instruction) is met.

A conditional branch instruction would cause a (nominal) penalty of one additional cycle in the exemplary pipeline, since a conditional branch must complete execution (EXEC) to determine that control is (or is not) to be transferred to TARG. If it is determined that control is not to be transferred to TARG, then the instruction that is to be decoded following the branch is the next sequential (by address) instruction to the branch. Thus, even when a conditional branch instruction is not taken, there is still a nominal delay of three cycles (in this example) associated with the branch.

Clearly, if it can be determined at decode time that a conditional branch instruction will not be taken, then there would be no penalty associated with the instruction, i.e., the next sequential instruction can be decoded immediately following the decode of the branch instruction. However, if it is determined at decode time that the branch instruction will be taken, then there is still a two-cycle penalty associated with the branch, i.e. the target address must be generated, and the target instruction must be fetched (but the extra cycle in which the branch is executed (EXEC) is saved in this case).

A number of patents are directed to branch prediction mechanisms, each having certain advantages and disadvantages. For example, U.S. Pat. No. 4,370,711 to Smith discloses a branch predictor for predicting in advance the result of a conditional branch instruction in a computer system. The principle upon which the system is based is that a conditional branch instruction is likely to be decided in the same way as the instructions most recent execution.

Other patents, such as U.S. Pat. No. 4,477,872 to Losq, et al and U.S. Pat. No. 4,430,706 to Sand, describe a decode time prediction mechanism called a "Decode History Table" (DHT). A decode time prediction mechanism, such as a DHT, will save (if it predicts correctly), three cycles for branches that are not taken, and one cycle for branches that are taken in the exemplary pipeline.

The DHT is a table of entries where an entry is accessed based on a transformation (hash or truncation) on the bits that compose the address of a branch instruction. The entry itself comprises a single bit: the bit is set if the corresponding branch instruction was taken the last time that it was executed, otherwise the bit is not set.

When a conditional branch instruction is decoded, the DHT is accessed with the address of the branch instruction. If the DHT entry is set, then it is guessed that the branch will be taken; the target address is generated, and the target instruction is fetched, and decoded on the third cycle following the decode of the branch instruction (thereby saving one cycle of delay). If the DHT entry is not set, then it is guessed that the branch will not be taken; the next-sequential instruction is decoded on the cycle following the decode of the branch instruction (thereby saving three cycles of delay). If it is found that the DHT predicted erroneously (i.e., the prediction did not agree with the branch outcome as computed in EXEC), then the corresponding entry is corrected.

A decode-time prediction mechanism offers an opportunity to avoid: all penalty for not-taken branches, and the execution-time penalty (typically one cycle) for taken branches. Variations on decode-time mechanisms can only reduce branch penalty further via more accurate prediction. However, even in the limit (i.e., 100% accuracy), a decode-time mechanism cannot eliminate all branch penalty. Specifically, whenever there is a taken branch, there is a penalty equal to the time to generate the target address and fetch the target instruction. This is because a decode time mechanism like the DHT provides a way of queing the action but not the target, of a conditional branch instruction. Therefore, the only way to reduce branch peanlty even further is to anticipate taken branches and to fetch target instructions prior to the time that the branch instructions are actually encountered (decoded). So called "prefetch-time prediction mechanisms" attempt to do this.

To achieve this further reduction in branch penalties an autonomous instruction-prefetching "engine" must exist. In the absence of a prefetch-time prediction mechanism per se, a simple prefetch engine may comprise: i) an incrementer used to "step" through sequential instruction addresses, ii) an instruction buffer for holding sequential instructions to be "consumed" by the decoder, iii) a means for using the sequential addresses produced by the incrementer to fetch sequential blocks of instructions from the cache and place them in the instruction buffer, and iv) a means for the processor to supply a new starting address (branch target address) to the incrementer in the event of a taken branch instruction. By "autonomous", it is meant that the engine if free-running (independent of the decoder) so that (in the absence of taken branches) the instruction buffer always contains next-sequential instructions to be consumed by the decoder. (Hence, there is no penalty for correctly guessed conditional branches that are not taken.)

A prefetch-time prediction mechanism is a mechanism that is incorporated into the prefetch engine (as opposed to a decode-time mechanism, which operates in conjunction with the decoder). A prefetch-time mechanism ensures that the instruction buffer contains the branch target instruction at the time that the branch instruction is decoded; if it is successful in this endeavor, then the branch target instruction can be decoded immediately following the decode of the branch instruction. Thus, a prefetch-time mechanism eliminates all branch penalty (even for taken branches) when it predicts correctly.

Most (if not all) prefetch-time prediction mechanisms are variations on the "Branch History Table" (BHT) as first described in U.S. Pat. No. 3,559,183, to Sussenguth, assigned to the assignee as the present invention.

The strategy taught in the Sussenguth patent is based on the observation that most branches, considered individually, are consistently either taken or not taken and if taken, will have a consistent target address. In this strategy a table of taken branches is constructed. Each entry in the table consists of the address of the taken branch followed by the target address of the branch. This table is a hardware construct and so it has a predetermined size, typically from 1024 and 4096 entries. Entries are made only for taken branches as they are encountered. When the table is full making a new entry requires displacing an older entry. This can be accomplished on a Least Recently Used (LRU) basis as in caches.

A BHT is the prefetch time analog of the Decode History Table. That is, BHT entries are accessed based on a transformation (hash or truncation) on the bits that compose the address of the block of instructions that is being prefetched. The entry itself is much more complex than a DHT entry, since the BHT is "blindly" operating at prefetch time, i.e., it is merely fetching blocks of instructions without the benefit of being able to examine the content of these blocks.

A BHT entry must be able to identify that the associated block of instructions contains a taken branch (based on the processor having previously encountered a taken branch within the block). Further, it must be able to identify where (within the block) the taken branch instruction resides, since the particular branch instruction may (or may not) be relevant to current instruction fetching depending on where the block is entered (i.e., depending on current branch activity). Finally, a BHT entry must specify the branch target address, so that prefetching can be immediately redirected down the target path should the particular branch be relevant to the current prefetch activity. Known BHTs have these abilities.

According to the prior art, when the processor encounters a branch instruction that is found to be taken, it creates a BHT entry based on the address of the branch (the entry itself will contain the branch target address). If the particular section of code (containing the branch) is ever reencountered, then the BHT entry is able to cause prefetching to be redirected at the time that the branch instruction is prefetched. When the BHT redirects prefetching, it also enqueues information regarding this action (e.g., the address at which it "believes" there is a taken branch, and the target address of the branch) at the processor. As the processor subsequently executes the code that has been prefetched, it has three opportunities to determine that the BHT was (or was not) correct. If it is the case that the BHT correctly anticipated the branch, then there is no penalty associated with the branch, otherwise, there may be a severe penalty associated with having "guessed" wrong. The three times at which a BHT error can be discovered are as follows.

The first opportunity is at decode time (DEC) where a "branch wrong guess" (BWG) can manifest itself in one of two ways. First, if the decoder encounters an unconditionally taken branch, and the BHT has given no indication of this branch, then it is known that the BHT is wrong. The appropriate action at this point is to execute the branch in the canonical way, and to create a new BHT entry to indicate the presence of the branch. Second, if the BHT has indicated a taken branch at a given address, and the instuction that is decoded at this address is not a branch instruction, then it is known that the BHT is in error. The appropriate action at this point is to delete the offending entry from the BHT, and to abort the redirection in instruction prefetching that was effected by the presence of the entry. (Note that in this latter case, the BHT may have caused cycles of penalty to be incurred via redirection of instruction prefetch when there was no branch instruction in the code.)

The second opportunity to detect a BWG is at address-generation time (AGEN). A BWG manifests itself if the target address that is generated is not the same as the target address that was predicted (and enqueued at the processor) by the BHT. The appropriate action at this point is to correct the target address in the BHT entry, to abort the instruction prefetching that was directed down the erroneous target path, and to redirect instruction prefetching down the correct target path.

The third and final opportunity to detect a BWG is at execute time (EXEC). The only branches that can possibly cause a BWG at this point are conditional branches, since the resolution of the branch condition is performed during EXEC. A BWG occurs if EXEC determines that the branch is taken when the BHT gave no indication of such, or if EXEC determines that the branch is not taken when the BHT indicated that the branch would be taken. In either case, the appropriate action is to update the BHT to indicate the new action of the branch, and to redirect instruction prefetch in accordance with the new action.

The primary causes for BWG at these three different points are as follows:

(1) BWG arises at DEC for three reasons. First, in code that has never been previously encountered, there is no history available for the code. Thus, unconditionally taken branches are not known to the BHT. There is no way to remove this category of BWG, i.e., if there is no history then there is no way to anticipate the branch. Second, since the BHT is a finite hashed table controlled by some replacement algorithm, valid history can be overwritten by more recently made entries. Third, since the BHT is a finite hashed table, and since (possibly) multiple addresses map into the same BHT entry, "false hits" arise when there is no branch in the current code, but there is a branch instruction at some other address that happens to map into an entry that is shared by the current code. The second and third types of errors can be reduced by making the BHT larger, and by making the hashing function more precise—these solutions are straightforward.

(2) BWG arises at AGEN because there are some subset of branch instructions that do not always branch to the same target address.

(3) Finally, BWG arises at EXEC because the BHT is a history-driven mechanism (i.e., it predicts that a branch instuction will always do what it did the last time), and conditional branches do not always behave in this way. The very fact that a branch is conditional indicates that there are some (possible) conditions that will cause the branch to be taken, and some (possible) conditions that will cause the branch to be not-taken, even if one of the sets of conditions is unlikely.

U.S. Pat. No. 4,763,245 to Emma, et al, assigned to the assignee as the present invention, teaches a mechanism that reduces this last form of error. U.S. Pat. No. 4,763,445 is hereby incorporated by reference.

The branch prediction mechanism taught in the incorporated patent employs a BHT that is updated using an operand sensitive branch table referred to as a "Data Dependent Branch Table" (DDBT). The principle can be illustrated via the following example. Consider a segment of code that is run several times in succession (not necessarily contiguous in time). A history-based mechanism such as the DHT or the BHT will predict that each specific branch instruction within the code will do exactly the same thing (be taken or be not-taken) each time that the code is run. Although this type of guess works extremely well for many of the specific branches within the code, there are some specific branches for which this forms a very bad prediction. If it is not true that a given property of a branch (e.g., whether it is taken) is invariant, then a history-based prediction mechanism cannot be founded on this given property; thus, to build a history-based predictor, it is necessary to identify some property of the branch that is invariant, and to found the predictor on that property.

The DDBT taught in the referenced application is predicted on the typical logical operation of a conditional branch instruction. First, there is some instruction that precedes the branch instruction—this preceding instruction performs an operation (say, a test) on an operand (say, a byte in memory), and it sets a condition-code in the processor based on the outcome of the operation. Next, the branch instruction examines the state of the condition-code in the processor, and it branches (or falls through) based on this state. Thus, if a particular branch instruction is first observed to be taken, and is subsequently observed to be not-taken, then there are only two possible reasons for this change: either the operand that is tested by the preceding instruction has been changed by a store instruction since the last time that the branch was encountered, or the preceding instruction is performing the test on a new operand location (e.g., the address of the operand has changed). The "Data Dependent Branch Table" (DDBT) is predicated on the first of these causes, i.e., it is based on an invariance in operand location.

As described in the patent incorporated by reference, the DDBT is a table that keeps track of those operand locations that are known to affect conditional branch instructions. For each known operand location, the DDBT indicates the address of the branch that is affected, as well as the way in which the branch is affected (e.g., the test that is performed on the operand, and the branch condition) and the most recent history of the branch outcome. Whenever a store operation is performed by the processor, the DDBT is searched to determine whether the location to which the store is directed is one of these operand locations. If this search produces a "hit" (i.e., if such an entry is found), then the new value that is being stored is subjected to the test and condition (from the DDBT) to determine whether the new operand value will change the branch outcome. If the determination is that the branch outcome will be changed as a result of the store, then the corresponding BHT entry is changed to reflect this. When the corresponding branch instruction is subsequently encountered, the BHT will make the correct prediction if the test operand location is in fact invariant, otherwise it cannot be determined whether the prediction will be correct.

The incorporated patent teaches creating a DDBT entry at the time of a BWG on the part of the BHT. That is, the entry is created at the earliest possible time at which it is known that the branch outcome is not invariant. Since no special attention is paid to the branch prior to the BWG, it is not actually known that the operand location that influences the branch is invariant, i.e., the act of creating the DDBT entry is merely a "guess" that the branch can be predicted in this way. Although this guess is correct for many of the branches that are not invariant in outcome, there are some number of branches that vary both in outcome and in test operand location. Test instructions for these branches test operands from new locations each time they are executed, and thus, focusing on one particular location produces branch guesses that are not related to the operands that will actually determine the subsequent outcomes of the branch. Essentially, subsequent branch guesses are random if the branch has this property and the DDBT is attempting to aid the prediction.

Thus, there are some subset of the branches that are irrelevant to the DDBT, nonetheless, the DDBT as described in the incorporated patent will inevitably try to predict them. Further, a large fraction of these branches are fairly (though not perfectly) predictable via the BHT (or DHT). Therefore, once it is known that the DDBT is not an appropriate mechanism for predicting a particular branch, it is desirable to ignore "corrections" issued by the DDBT, and it is desirable to inhibit that particular branch from creating new DDBT entries on the BWG event. Even if the loss in accuracy is tolerable vis-a-vis irrelevant predictions, one effect that these branches have is to create large numbers of (irrelevant) DDBT entries, thereby overwriting many useful entries and impacting the effectiveness of the DDBT with regard to other branches.

A further problem regarding these entries (even if the history table can be made to "ignore" updates that are effected by the entries) is that the BHT (or DHT) must still take the time to ignore them. That is, when an irrelevant update is issued by the DDBT, it causes, for example, the BHT to be searched which in turn generates superfluous traffic in the BHT impacting the timeliness with which the BHT is able to (accurately) direct prefetching. Therefore, it is also desirable to remove offending entries from the DDBT so as to limit the amount of superfluous traffic through a history table.

The very property that makes a particular DDBT entry undesirable is also the property that makes the particular entry difficult to remove. Specifically, since the DDBT must respond to store traffic (i.e., the DDBT is searched to see whether the operand that is being stored affects a given branch), entries are located in the DDBT based on operand address. A DDBT entry is found to be useless when it is discovered that the test instruction (preceding the branch) performs tests on different operand locations. Thus, by the time this discovery is made, the new operand location associated with the branch has no relation to the old operand location (i.e, there is no record associated with the branch that designates the old operand location), yet the offending entry is stored in the DDBT based on the old operand address. I.e., at this point in time it is known that there is an offending entry in the DDBT, but it is unknown where the offending entry is located. This makes it difficult to remove the entry.

SUMMARY OF THE INVENTION

It is an object of the invention to improve branch prediction mechanisms (such as a BHT or DHT) that utilize a DDBT (as taught in the incorporated patent) in predicting branch action outcomes, by making the BHT (or DHT) impervious to DDBT updates for "moving target" operands. Such operands are, for example, typical when chaining through control blocks.

It is a further object of the invention to provide an improved branch prediction mechanism which is sensitive to those operands that will be tested in order to determine branch action outcome, and which is also sensitive to operand location. This added sensitivity (to operand location) can be used to avoid random branch guessing that results when a DDBT being used to aid in branch prediction operates in the face of a branch operand location which is itself a variable.

Furthermore, it is an object of the invention to identify when a DDBT is not an appropriate mechanism for predicting a particular branch and to be able to ignore "corrections" or updates issued by the DDBT in such circumstances.

Further yet, it is an object of the invention to prevent such branches from creating new DDBT entries on the BWG event.

Still further, it is an object of the invention to be able to remove DDBT entries associated with variable operand locations once it is known that the DDBT is not an appropriate mechanism for predicting a particular branch. This feature would limit the amount of superfluous traffic through the BHT (or DHT), caused by the aforementioned irrelevant updates issued by the DDBT.

According to the present invention, methods and apparatus are described which are sensitive to branch mispredictions and to operand addresses used by the DDBT, to identify irrelevant DDBT entries.

The preferred embodiment of the invention calls for the identification of irrelevant DDBT entries to be made within the branch prediction mechanism using state bits which, when set, indicate that: (1) a given BHT entry was updated by the DDBT and (2) subsequent to such update a misprediction occurred making further DDBT updates irrelevant. Once a DDBT entry is determined to be irrelevant, it is prevented from updating the prediction mechanism.

The invention also provides methods and apparatus for locating and removing irrelevant entries from the DDBT. The update packet (described in the incorporated patent) sent by the DDBT to the history based prediction mechanism, is expanded to include the test operand address actually used by the DDBT. If the update request results in a BHT (or DHT) hit to an entry with both bits set, then the operand address can be used to locate and delete the irrelevant DDBT entry since the DDBT itself is organized based on operand addresses. Additionally, the invention provides for inhibiting creation of further DDBT entries should a BWG event occur subsequent to a DDBT update to a given prediction mechanism entry.

These and other objects and features of the invention will become apparent to those skilled in the art upon consideration of the following detailed description in conjunction with the accompanying Drawing.

DETAILED DESCRIPTION

Figure 1:
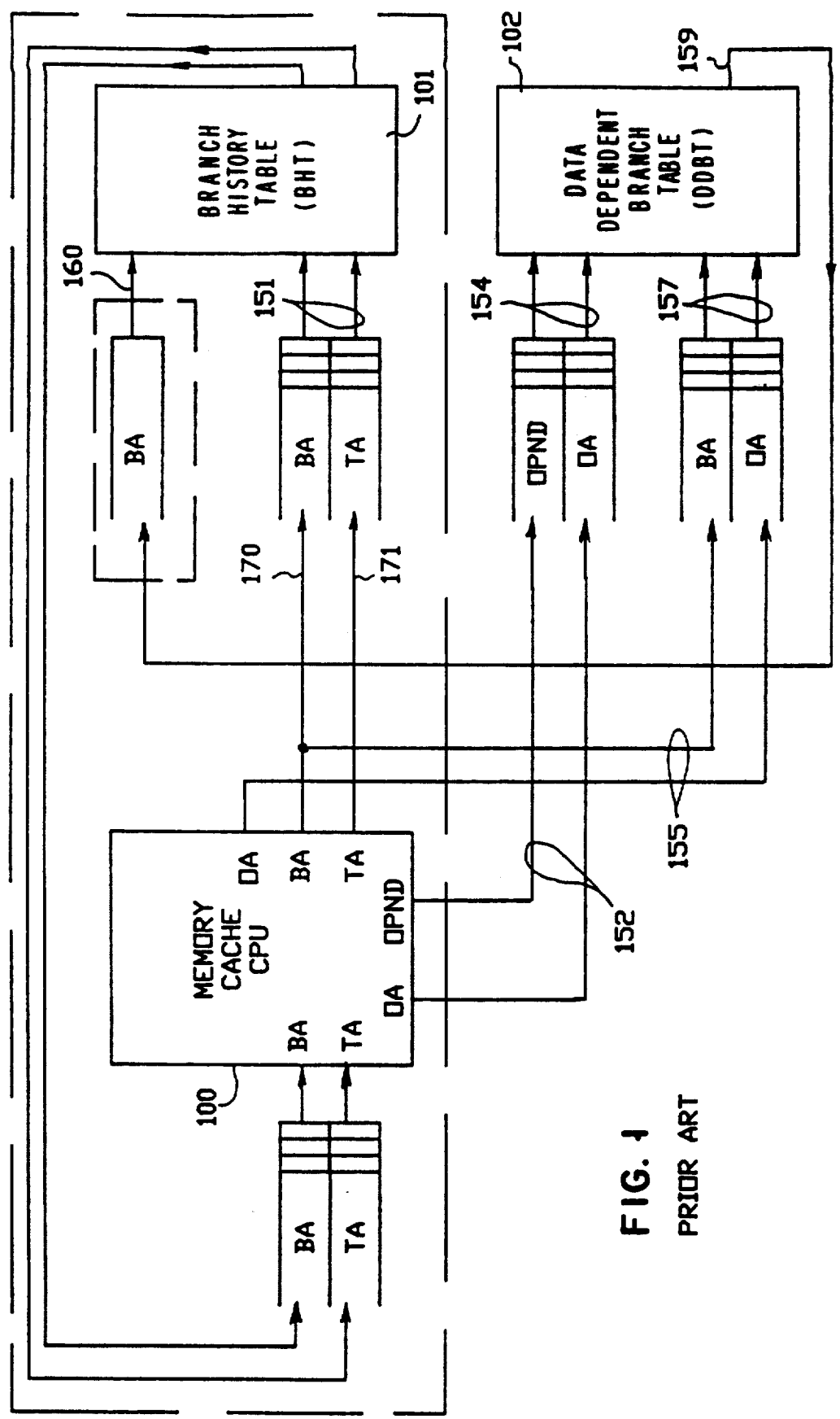
FIG. 1 is a high level representation of the prior art branch prediction mechanism/DDBT combination as described in the incorporated patent.

The incorporated patent describes in detail a DDBT which monitors stores made to pertinent data (presummably at invariant operand locations) and which updates a BHT in the event any such stores will cause a dependent branch to change action. More particularly, the incorporated patent teaches a BHT updating scheme, an exemplary DDBT structure, a method for coupling the DDBT to the BHT through updating hardware, and a method for inserting and deleting entries to/from the DDBT.

The operation of prior art DDBT/branch prediction mechanism combinations is improved upon (using the instant invention) by making the branch prediction mechanism (such as a BHT) impervious to DDBT updates triggered when the test operand, associated with a given BHT entry, is variable.

For the purpose of illustration only, the description of the invention will be set forth in the context of a DDBT/BHT combination. However, this is not intended to limit the scope of spirit of the invention since those skilled in the art will readily appreciate that the principles to be set forth hereinafter are applicable to other history based branch prediction mechanisms, like the DHT.

The DDBT described in the incorporated patent, operating in conjunction with a BHT:

(1) Contains an entry for each pertinent byte comprised of:
(a) the address of the byte,
(b) the address of the branch instruction whose action is determined by the byte,
(c) the target address of the branch, should the branch be taken,
(d) an encoding that specifies a means for testing the pertinent byte to determine, for a specific branch, the branch action,
(e) an action bit that specifies the outcome of the branch test relative to the last instance of the pertinent byte;

(2) Is searched by each store operation to determine whether or not (via a match against (a) above) the store is being made to one of the bytes in the table, and if a match is found;

(3) Is able to generate the next branch outcome by using (d) above in conjunction with the new instance of the byte being stored, and by comparing the new outcome with (e) above;

(4) Is able to determine if the next execution of the branch specified by (b) above, should it occur, have the same action as the previous execution, and if not;

(5) It makes an entry in the BHT, or deletes an entry from the BHT (whichever is appropriate) using (b) and (c) above, so that on the next occurrence of the branch, the BHT will make a correct prediction.

In short, the DDBT is a table that establishes a correspondence between an operand and a branch where the operand and the branch are identified by their addresses. The preferred DDBT is organized on the basis of operand address and each entry (as indicated hereinbefore) contains at least the branch address, action (what the branch did) and indication of method of test.

Prior art BHTs are organized on the basis of branch address and contain at least the branch address tag (inherent in the tables set associative structure), the target address for taken branches and the indicator of the prior branch action (taken or not taken).

In order to appreciate the improvement brought about by the present invention, reference should first be made to FIG. 1.

FIG. 1 is a high level representation of the prior art branch prediction mechanism/DDBT combination described in the incorporated patent. For the sake of illustration only, the branch prediction mechanism is shown as a BHT.

The portion of FIG. 1 shown bounded by the two dashed lines, depicts a combination of a processor, memory (main store and cache) and the BHT.

The memory, cache and the CPU are shown as unit 100. The BHT is shown as unit 101.

When a branch instruction is encountered by the processor and the first taken branch occurs, a BHT entry is first created (via paths 170, 171 and 151). The Branch Address (BA) and target address (TA) are "entered" into BHT 101 via path 151. The BHT is organized based on BA. Each entry comprises the TA which is stored along with a "valid" bit. The valid bit can also be viewed as a "taken branch" action indication. A subsequent change in action can be indicated by resetting the valid bit, effectively removing the entry from the BHT.

The prior art prefetch mechanism, shown bounded by dashed lines, will guess that the next occurence of the branch will be taken without regard to any change in either the operand value or operand test location.

The improvement taught in the incorporated patent (the rest of the combination depicted in FIG. 1), utilizes DDBT 102 and signal paths 152, 154, 155, 157, 159 and 160 to monitor stores to a given operand address (OA) and update BHT 101 if appropriate. Initially, DDBT 102 is empty. As taught in the incorporated patent, DDBT entries are created via paths 155 and 157 (shown to associate the BA and OA) on a BWG event.

Subsequently, if a store to the OA occurs via unit 100, both the OA and the operand itself are supplied to DDBT 102 via paths 152 and 154. If DDBT 102 (organized on the basis of operand address) contains an entry corresponding to the OA, then, as taught in the incorporated patent, the operand is subjected to the relevant test condition and a determination is made as to whether or not branch action will change.

In the event of no change in branch action, no BHT update is required. The prefetch branch prediction mechanism will work properly. In the event of a new branch action, the BHT must be updated (entry removed). The BA (via path 159 and 160) is used to purge the relevant entry from the BHT, by, for example, resetting the valid bit associated with the entry.

The prior art branch prediction system depicted in FIG. 1 works well if the operand address associated with a given branch instruction is invariant. However, as indicated hereinbefore,. problems can result if such an operand address is not invariant.

Figure 2:
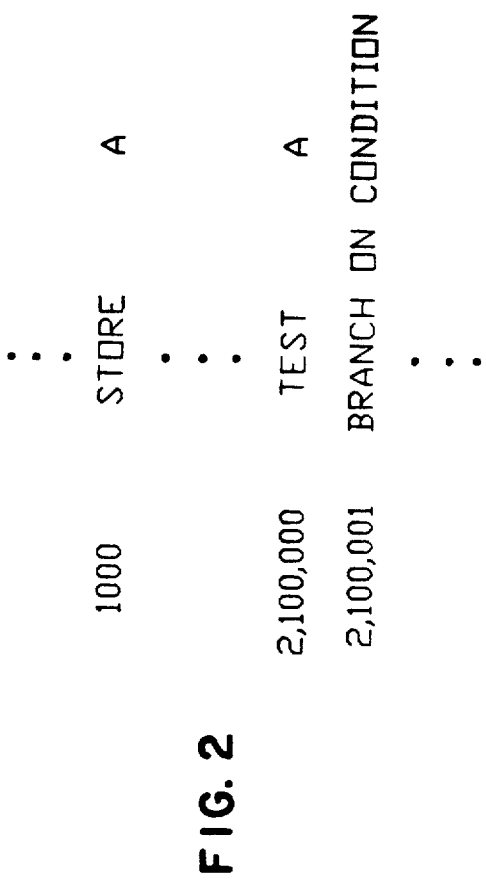
FIG. 2 depicts an instruction sequence which is useful in explaining how the DDBT/BHT combination of FIG. 1 works and why this combination when used to determine branch action with variable operand locations is problematic.

FIGS. 2 depicts an instruction sequence which is useful in explaining the prior art DDBT/BHT combination of FIG. 1 and which can also be used to illustrate the problem that occurs using this combination with variable operand address locations.

Suppose processor 100 of FIG. 1, in response to a store instruction at location 1000 in memory, stores an operand value, x to operand address A. Typically, as shown in FIG. 2, a test based upon the value of the operand at location A will normally preceed a branch condition instruction. The test is normally performed many instructions beyond the store to the operand location (illustrated in FIG. 2 by the test occurring at instruction address 2,100,000).

The system shown in FIG. 1, using the DDBT/BHT combination, is able to determine the branch outcome shortly after the store to A as described in the referenced patent. Assuming that A itself is not a variable, the prior art system works well.

However, if A is a variable, then the store to A shown at instruction location 1000, and the subsequent computing of the test and branch outcome by the BHT/DDBT combination of FIG. 1, may have nothing to do with branch outcome. Clearly, this can be seen to be the case if, for example, the relevant operand location is address B, and A (the variable operand address) is changed to B before instruction 2,100.000. In this case, the prefetch is performed on a value located at the wrong operand location (A instead of B).

Figure 3:
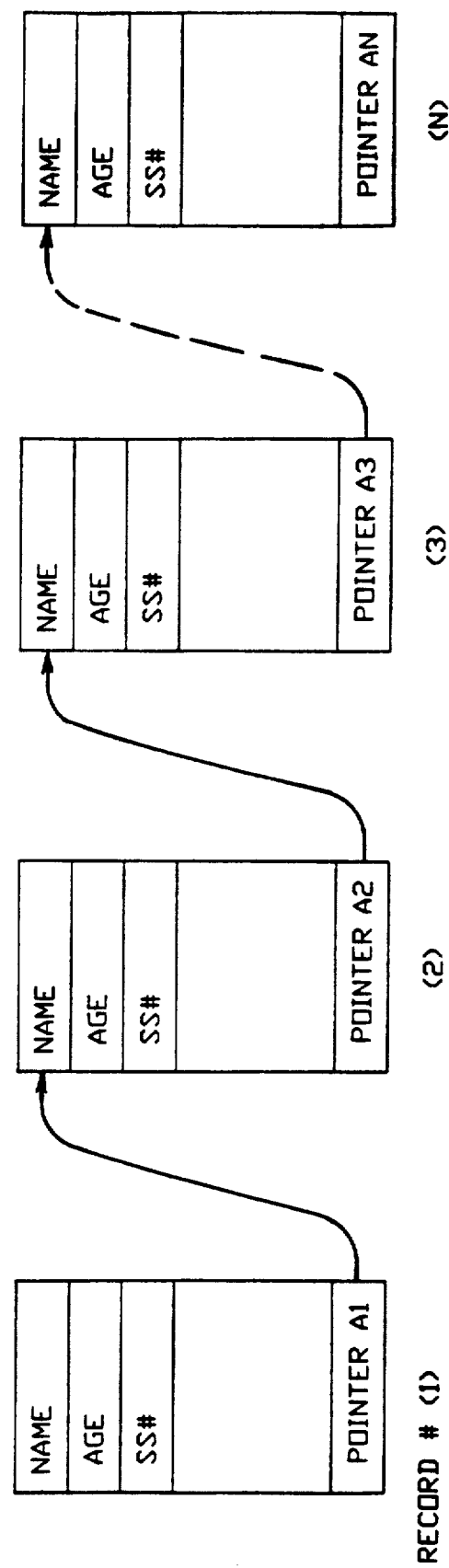
FIG. 3 depicts an example of a linked list used for chaining through a set of control blocks in which the location of a test operand is typically not invariant.

A situation where this can (and frequently does) occur is depicted in FIG. 3. There, a plurality of records (records 1-n) each containing, for example, employee name, age, social security number, etc., are shown linked by pointers (A1-An) at the end of each record.

If a particular social security number were being looked up, typical code for finding the record with the sought after number might be: (1) LOAD new pointer value; (2) GO TO FOUND if social security number matches a specified value; (3) ELSE, get the next record (i.e., loop to LOAD new pointer value) and continue. Based on the depicted record structure, the actual address of the social security number under test is constantly changing. In record number 2 the social security number would be at operand address A1+2, in record number 3 the number would be at operand address A2+2, etc.

Using the system depicted in FIG. 1, this type of code would likely give rise to a multiplicity of BWG events, causing the DDBT to be filled with useless data as described hereinbefore.

The preferred embodiment of the invention avoids the problems associated with determining a branch action, where the address of the operand under test is itself a variable.

According to the invention, 2 state bits are associated with each BHT entry. The preferred meaning of these bits and the states that can be represented by them, is depicted in FIG. 4.

Figure 4:
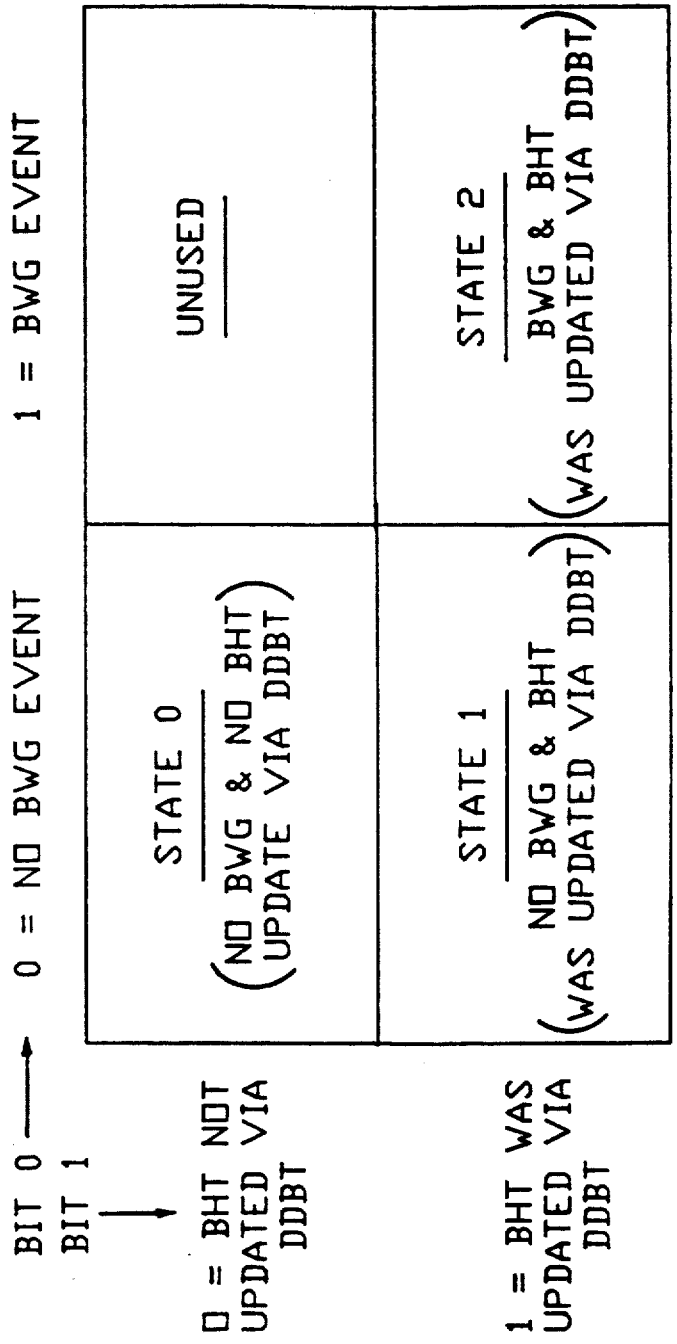
FIG. 4 depicts a set of possible states which, according to the invention, are associated with branch prediction mechanism entries (e.g., BHT entries) and which are useful in identifying DDBT entries that are irrelevant because of varying operand locations.

FIG. 4 shows bit 0 (one of the two bits), being initially zero when a given BHT entry is created. Bit 0 is set to one on the occurrence of a BWG event (with respect to the given BHT entry) when the BWG event occurs after a DDBT update to the given BHT entry. Bit 1 (the other bit) is initially zero, and is used to indicate that the BHT has not been updated via the DDBT. Whenever a BHT entry is updated with the assistance of the DDBT, bit 1 is set to one.

According to the preferred embodiment of the invention, the following 3 states are defined and summarized in FIG. 4:

(1) When a newly encountered taken branch is executed and a new BHT entry is created, the BHT entry is set to State 0.

(2) If a "State 0" branch entry generates a BWG, then a DDBT entry is created. (The BHT entry remains "State 0").

(3) When a store occurs that causes the DDBT to update the BHT, then the corresponding BHT entry (if in State 0 or State 1) becomes State 1. (State 2 branches will be seen to ignore DDBT updates).

(4) If a State 1 BHT entry causes a BWG, State 2 is entered and further DDBT entries corresponding to the BHT entry are inhibited.

(5) Finally, if a State 2 BHT entry receives an update, the update is ignored and the initiating DDBT entry is deleted.

Figure 5:
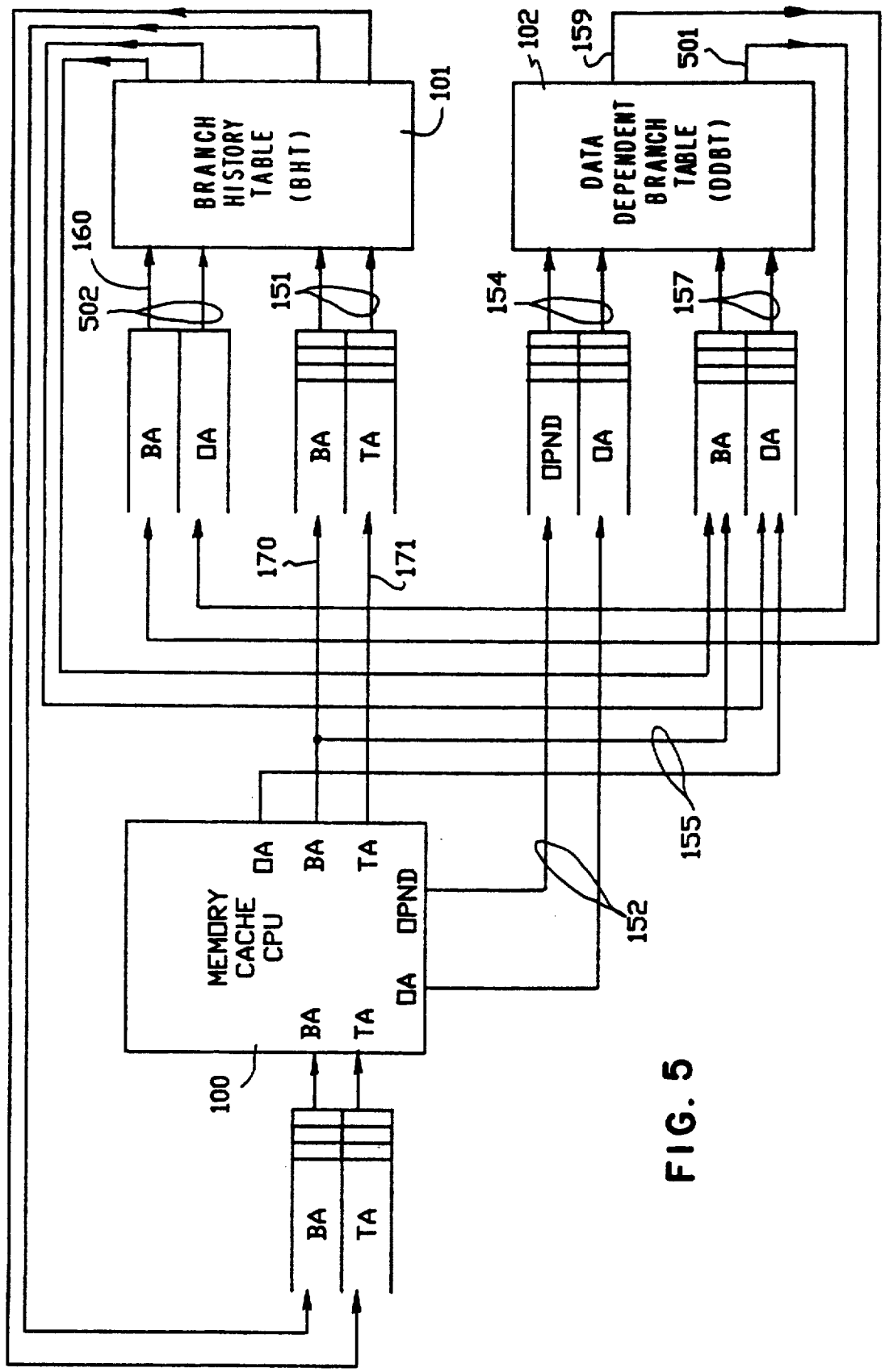
FIG. 5 depicts a high level representation of the hardware supporting the invention, particulary pointing out the additional signal paths needed to realize the invention in the context of the BHT/DDBT combination dispicted in FIG. 1.

The modifications to the system depicted in FIG. 1 needed to realize the invention, are depicted in FIG. 5. These modifications, together with an explanation of how to modify the combination described in the incorporated patent, will enable those skilled in the art to implement the preferred embodiment of the invention.

FIG. 5 is the same as FIG. 1, with the addition of paths 501, 502 and 503. Conceptually, what is new is that in addition to BA indicating the branch whose action changed, the address of the operand that effected the change (OA) is part of DDBT 102's output packet (on paths 501 and 502). Although the BHT does not utilize the OA internally, the OA as part of the data packet from DDBT 102 is the means by which the invention is able to go back and purge the DDBT of an offending entry (via path 503) if BHT 101 is in State 2.

The 2 bits utilized in accordance with the preferred embodiment of the invention are not shown in FIG. 5, but are in fact associated with each BHT 101 entry and used as described hereinbefore to implement the invention.

An alternative embodiment of the invention could employ some type of buffering scheme for the OA, rather than sending the OA to the BHT in the update packet. The state bits could be located outside the BHT but remain associated with a given entry, in still another embodiment of the invention. Such alternate schemes would require more hardware and system overhead then the preferred embodiment.

As indicated hereinabove, path 503 is utilized to delete (purge) a given DDBT entry if an update to a BHT State 2 entry occurs. Again, the appropriate DDBT entry to purge will be known based on the operand address organization of the DDBT and the OA provided via the update package. All that needs to be done, for example, is to reset the valid bit associated with the given DDBT entry. The valid bit is stored in array 64 as shown in FIG. 2A of the incorporated patent.

To realize the remaining objectives of the instant invention, all of which are incorporated in the preferred embodiment, reference should be made to FIGS. 5 and 1B of the incorporated patent.

It should be recalled that it is desirable for the invention to (1) inhibit new DDBT entries on a BWG event for a given BHT entry if the BHT entry is in State 1 or 2 (i.e., if a BWG event occurs after a BHT entry is updated by the DDBT), and (2) it is desirable for the invention to ignore DDBT updates to a BHT entry that is in State 2 (i.e., a BHT entry that has been updated by the DDBT and subsequently guessed wrong).

To realize the first of these features (inhibit new DDBT entries) all that need be done is to inhibit AND gate 192, shown in FIG. 5 of the incorporated patent, whenever a BWG occurs with a BHT entry in state 1 or 2.

To realize the second feature, (ignore a DDBT update), one need only suppress the update on link 62 (shown in FIG. 1B of the incorporated patent) via correction control 60, also shown in the referenced FIG. 1B.

By making the modifications described hereinabove, to the methods and apparatus taught in the incorporated patent, all of the objects, features and advantages of the instant invention are realizable.

What has been described are methods and apparatus for insulating a branch prediction mechanism from data dependent branch table updates that result from variable test operand locations, meeting all of the objectives set forth hereinbefore. Those skilled in the art will recognize that the foregoing description of the novel methods and apparatus has been presented for the purposes of illustration and description only. It is not intended to be exhaustive or to limit the invention to the precise form disclosed, and obviously many modifications and variations are possible in light of the above teaching.

For example, as indicated hereinbefore, since the DDBT is a mechanism that supplements any history-based branch prediction mechanism, and since the teachings herein apply to history-based mechanisms independently of whether they are decode-time mechanisms or prefetch-time mechanisms, the invention can be used with processors having BHT/DDBT combinations or DHT/DDBT combinations.

The embodiment and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. In a computing machine, apparatus for predicting the outcome of branch instructions, comprising:
    a processor;
    memory for storing information for said processor, said information including instructions and operands;
    first means for performing history based branch prediction, including means for recording prior branch actions of branch instructions processed by said processor;
    second means for detecting occurrences of modifications to operands upon which at least some of said recorded prior branch instruction actions depended and correcting at least some of said recorded prior branch instruction actions which would have been recorded differently if said modifications to operands had occurred before said recorded prior branch instruction actions were recorded;
    third means for detecting occurrences of said recorded prior branch instruction actions which have been corrected by said second means and which still fail to correctly predict future outcome of said branch instructions corresponding thereto; and
    fourth means for preventing further corrections to be made by said second means to said recorded prior branch instruction actions detected by said third means.

2. Apparatus for predicting the outcome of branch instructions, as defined in claim 1, and wherein said fourth means comprises:
    fifth means for preventing said second means from detecting occurrences of modifications to operands upon which said recorded prior branch instruction actions detected by said third means depended.

3. Apparatus for predicting the outcome of branch instructions, as defined in claim 2, and wherein said first means is a Branch History Table (BHT).

4. Apparatus for predicting the outcome of branch instructions, as defined in claim 3, and wherein said second means is a Data Dependent Branch Table (DDBT).

5. Apparatus for predicting the outcome of branch instructions, as defined in claim 2, and wherein said first means is a Decode History Table (DHT).

6. Apparatus for predicting the outcome of branch instructions, as defined in claim 2, and wherein said third means detects occurrences of a recorded prior branch instruction action where an address changes of an operand upon which said branch instruction corresponding thereto depends.

7. Apparatus for predicting the outcome of branch instructions, as defined in claim 1, and wherein said first means is a Branch History Table (BHT) and said third means includes first tag means for tagging entries in said BHT which have been corrected by said second means.

8. Apparatus for predicting the outcome of branch instructions, as defined in claim 7, and wherein said fourth means includes second tag means for further tagging said entries in said BHT which already have been tagged by said first tag means, said further tagged entries being entries which have resulted in a Branch Wrong Guess after having been corrected by said second means.

9. Apparatus for predicting the outcome of branch instructions, as defined in claim 8, and wherein said further tagged entries are not corrected by said second means.

* * * * *